Sept. 2, 1924.    1,507,221
G. WEISS
EGG SEPARATING MACHINE
Filed March 13, 1922    3 Sheets-Sheet 2

Inventor,
George Weiss,
By [signature] Atty.

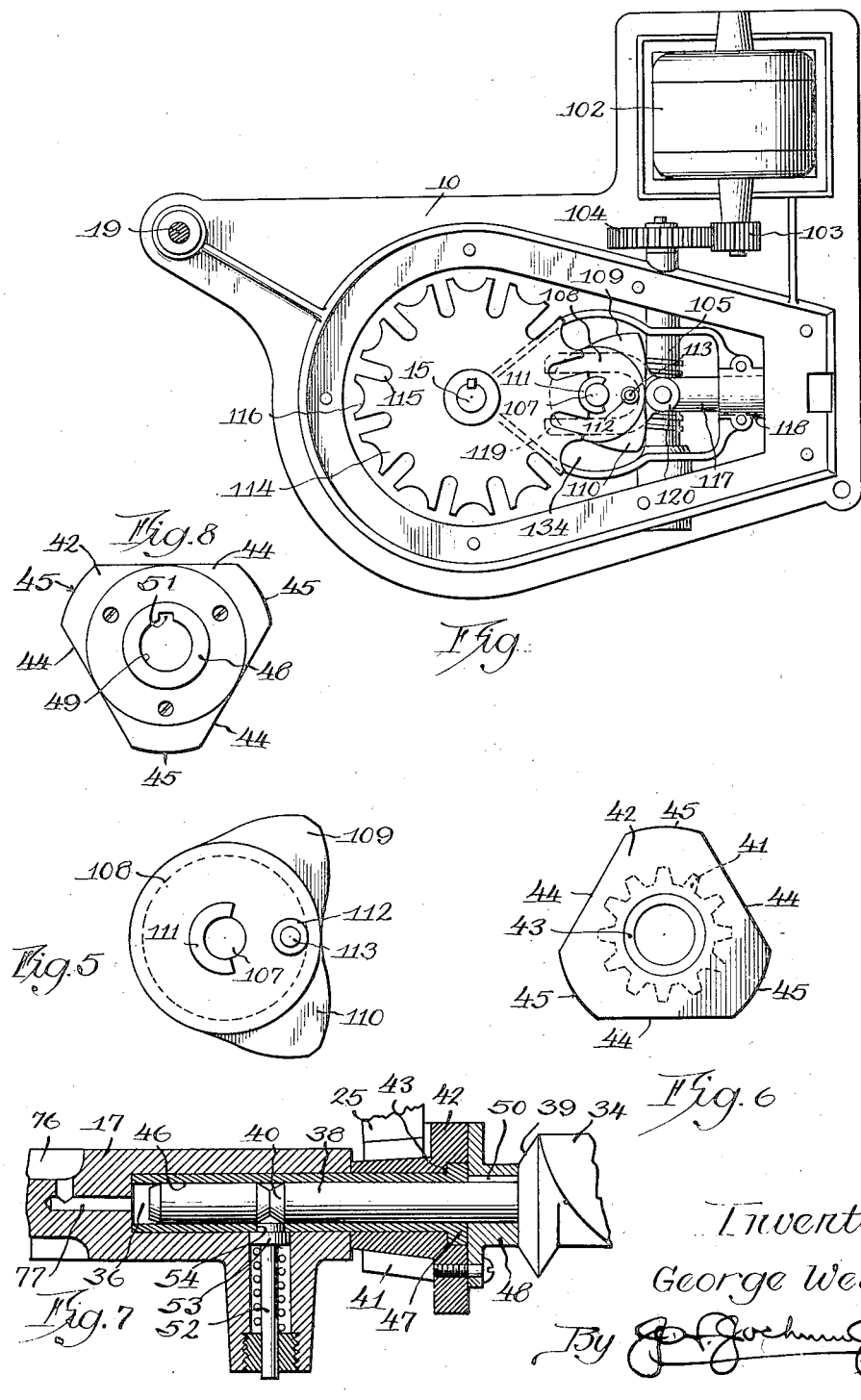

Patented Sept. 2, 1924.

1,507,221

UNITED STATES PATENT OFFICE.

GEORGE WEISS, OF CHICAGO, ILLINOIS.

EGG-SEPARATING MACHINE.

Application filed March 13, 1922. Serial No. 543,227.

*To all whom it may concern:*

Be it known that I, GEORGE WEISS, a citizen of the United States, residing at Chicago, in the county of Cook and State of Illinois, have invented certain new and useful Improvements in Egg-Separating Machines, of which the following is a specification.

This invention relates to improvements in egg separating machines for separating the contents of eggs, and one of the objects of the invention is to provide an improved device of this character by means of which the contents of an egg may be automatically, readily and expeditiously separated, and which device will be of a simple, durable, cheap and sanitary construction.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention and in which—

Figure 4 is a detail sectional view taken on line 4—4, Figure 1.

Figure 5 is a plan view of a detail.

Figure 6 is a view of one of the cup or receptacle turning and arresting members.

Figure 7 is an enlarged detail view partly in elevation and partly in section showing the bearing for the spindle of one of the receptacles.

Figure 8 is a view similar to Figure 6 showing the feather slot for locking the receptacle to the turning gear.

Figure 1:
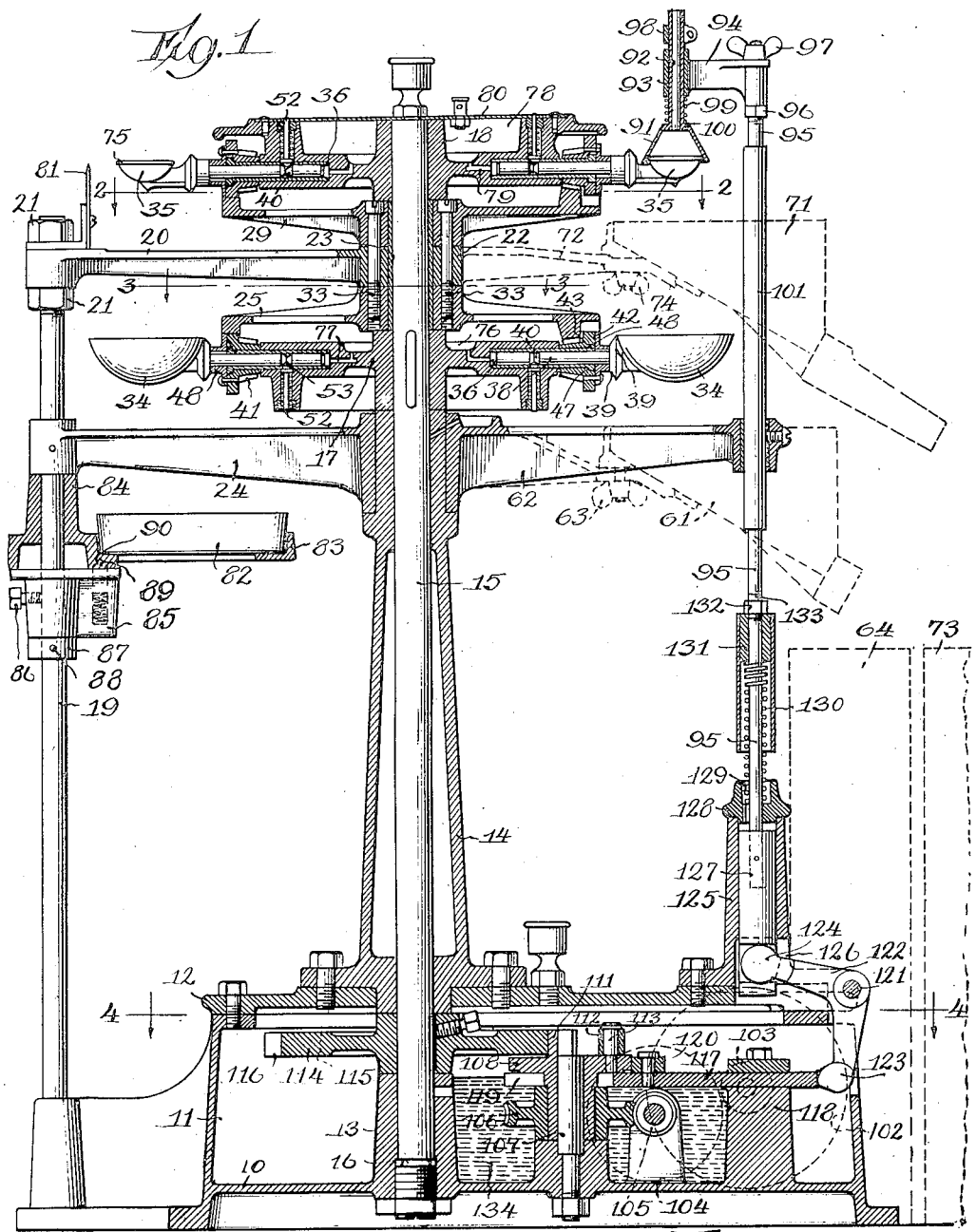
Figure 1 is a vertical, longitudinal sectional view.
Figure 2:
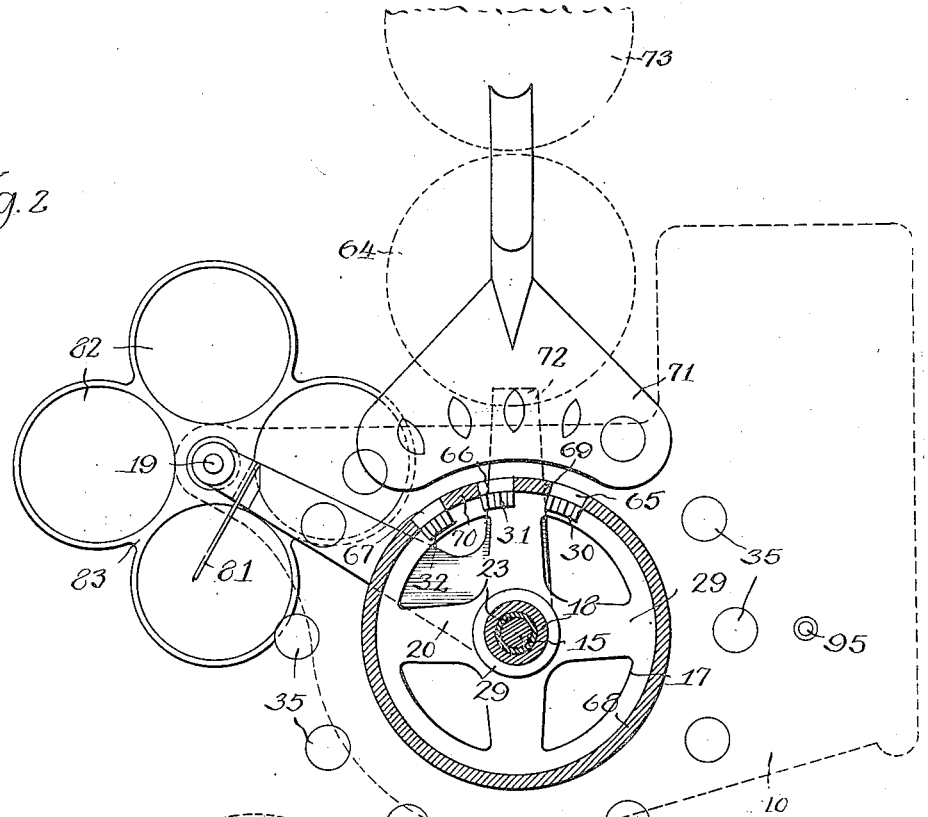
Figure 2 is a view taken on line 2—2, Figure 1, with parts omitted and partly in diagram.

Referring more particularly to the drawings the numeral 10 designates a supporting base which may be of any desired size and configuration, and is preferably of a hollow construction to form a chamber 11, within which portions of the operating mechanism, to be hereinafter described, are located. The chamber 11 is provided with a cover 12, which may be removably secured in position in any suitable manner.

Within the chamber 11 is arranged an upright bearing 13, and supported by the cover 12 is a standard 14 of any desired height and configuration. Passing through the standard 14 and having suitable bearings therein, is an upright shaft 15, one end of which extends into the bearing 13 in the base and engages an end bearing 16, which latter is preferably adjustable.

The shaft 15 projects for a considerable distance above the top of the upright 14 and secured to the shaft for rotation therewith are disc like members 17—18, which are of any suitable diameter and are spaced from each other in directions lengthwise of the shaft.

Rising from the base 10 is an upright 19, and carried by this upright preferably adjacent the upper end thereof is a bracket 20, preferably held in position by means of adjustable nuts or collars 21. This bracket 20 has a bearing 22, through which the shaft 15 passes and if desired a suitable bushing 23 may be interposed between the shaft and the bearing.

A bracket 24 is also connected with the upright 19 and is disposed beneath the disc like element 17 to receive the upper end of the upright or standard 14.

Figure 3:
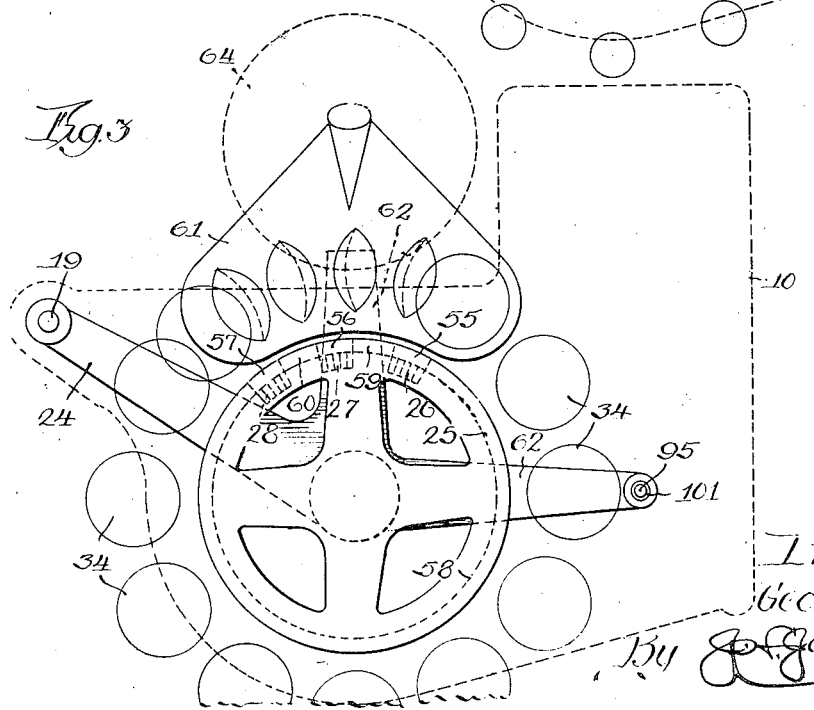
Figure 3 is a view taken on line 3—3, Figure 1, with parts omitted and partly in diagram.

Interposed between the bracket 20 and the disc like element 17 is a rack member 25 (see particularly Figure 3) which is provided with spaced series of teeth 26—27—28 on the lower face thereof, and for a purpose to be hereinafter set forth.

A second rack member 29 is interposed between the disc like element 18 and the bracket 20 and this rack member 29 is provided with a series of spaced teeth 30—31—32 on the upper face thereof, for a purpose to be hereinafter set forth.

These rack members 25 and 29 are preferably of a disc like or spider construction, and are held against rotation in any suitable manner preferably by means of fastening bolts or devices 33, any number of which may be provided, and which pass through the hub portions of the elements 25 and 29, and also through the bracket 20, so that when the shaft 15 is rotated these rack members 25—29 will be held stationary, and the rack members are so disposed that the respective series of teeth will be preferably positioned adjacent each other and so that they will become active at predetermined points in the cycle of operation of the machine.

Carried by the disc like element 17 are a plurality of cups or receptacles 34, of any suitable size and configuration, and carried by the disc like element 18 are a series of cups or receptacles 35, also of any suitable size and configuration, but the cups or receptacles 35 are preferably of a diameter somewhat less than the diameter of the cups or receptacles 34, the cups or receptacles 35 being adapted to temporarily retain the yolk of the egg until dumped therefrom, while the cups or receptacles 34 are adapted to receive and temporarily retain the albumen of the egg until dumped therefrom, as will be hereinafter described.

As the construction of each of the cups or receptacles 34—35 is the same, the specific description of one will apply equally as well to them all.

The elements 17 and 18 are provided with a series of bearing openings 36, which extend through the peripheries of the respective members and any desired number of such bearing openings may be provided according to the number of cups or receptacles it is desired to employ, but the number of cups or receptacles carried by each of the members 17—18 must be the same so that the cups and receptacles carried by the members co-operate in pairs.

The cup or receptacle is provided with a laterally projecting spindle bearing 38, having a shoulder 39 in proximity to the cup or receptacle and a circumferentially reduced portion 40 adjacent the free end thereof to form a groove encompassing the spindle.

A gear wheel 41, preferably in the form of a beveled pinion having a flange 42 is provided with a recess 43, which opens through the face of the flange, the flange being provided with cut-away portions 44, to form spaced substantially tooth shaped peripheral portions 45.

A bearing member 46, provided with a flange 47, passes through and beyond the pinion gear 41, so that the flange 47 will be seated in the recess 43. A bearing or cap member 48 is secured against the face of the flange 42 and is itself provided with a bearing 49, projecting beyond the face of the flange. The pinion gear 41 with the bearing member 46 thus secured thereto is adapted to be held in position or connected with the disc like member 17 by inserting the bearing member 46 into the recess 36, the recess being of such a diameter that the bearing member 46 will fit snugly therein and is of such a length that when the end of the bearing 46 abuts the bottom of the recess 36, the pinion gear 41 will rotate freely about the bearing 46. The pinion gear 41 is connected with the spindle 38 so as to cause the latter to rotate therewith in any desired or suitable manner preferably by means of a key or feather 50 carried by the spindle and which enters a slot 51 in the bearing 49 of the cap member 48. The spindle 38 may be held against accidental displacement from the bearing in any suitable manner preferably by means of a spring controlled pin or plunger 52, the head 53 of which is beveled so as to enter an opening 54 in the bearing member 46, which opening is in alinement with the groove or recess 40 in the spindle 38, so as to enter the groove. With this construction it will be manifest that the cup may be freely rotated permitting the spindle 38 to rotate in the bearing 46, and when it is desired to remove the cup all that is necessary is to draw the same outwardly as the wall of the recess or groove 40 will operate upon the head 53 of the spring plunger 52 to cause the latter to yield and the spindle 38 may be easily withdrawn from the bearing 46.

Obviously the cup is as readily replaced.

The pinion gears 41 carried by the cups 34 are so arranged with respect to the member 25 that they will successively engage the teeth 26—27—28 during the rotation of the member 17 carrying the cups 34 to rotate or dump the cups and then return them to their normal positions. The member 25 is provided respectively adjacent the teeth 26—27—28, with recesses 55—56—57, so as to receive the tooth like portions 45 of the flange 42, which is carried by the pinions 41, thereby permitting the pinions to rotate and thus rotate the cups. The portions 58—59—60 of the member 25 are flat so that during other portions of the cycle of rotation of the member 17, the pinion gears 41 together with the cups 34 will be locked against rotation.

It will thus be seen that as the shaft 15 rotates carrying with it the member 17, which supports the cups 34, the cups will, during certain portions of the rotation of the member 25, be held in an upright position, so as to receive a portion of the contents of the egg and will be locked in this position until the pinions 41 engage the teeth 26—27—28, at which time the cups will be rotated to dump the contents thereof. Adjacent the teeth 26—27—28 is a suitable chute 61, which is supported in any desired or suitable manner but preferably by means of an arm 62 on the bracket 24, the chute being preferably removably secured in position by means of a suitable fastening device 63, the chute discharging into a receptacle 64.

The member 29 is also provided with recessed portions 65—66—67 respectively adjacent the teeth 30—31—32, while the portions 68—69—70 of the member 29 are smooth so as to be engaged by the portions 44 of the respective flanges 42 carried by the pinions, the recesses 65—66—67 being provided to permit the entrance thereinto of the tooth like portions 45 of the flanges to permit the cups to be rotated.

The teeth 30—31—32 are arranged adjacent a chute 71, which is supported in any desired or suitable manner, preferably by means of an arm 72, connected with the bracket 20, and this chute 71 discharges into a receptacle 73, the chute being preferably secured in position by means of a suitable fastening device 74, so that when the cups or receptacles 35 are dumped, the contents thereof will be delivered into the chute 71 and from the chute 71 into the receptacle 73.

The operation of the portion of the machine thus far described briefly stated is as follows:

In their normal positions the cups 34 and 35 are positioned to receive the contents of the egg, that is to say after the egg-shell has been broken, the albumen and yolk are delivered into one of the cups 35, the cups 35 being of a shape that when the contents of the egg are first deposited thereinto the contents will be delivered to the center of the cup, and the cup is of such a size that the albumen will run or spill over the side of the cup and will drop from the cup 35 into the cup 34, directly therebeneath, thereby automatically separating the albumen and yolk. If desired the edge 75 of the cup 35 may be of any suitable shape or configuration to expedite the separation or severance of the albumen from the yolk.

The cups 34 and 35 will remain in this position until the members 17 and 18 have advanced to the point in their cycle of operation that the beveled pinions carried by the cups will engage the respective teeth 26—27—28 and 30—31—32 of the members 25 and 29, at which time further advancement or operation of the machine will cause the cups 34 and 35 to be rotated and thereby dump the contents therefrom into the respective chutes to be delivered into the separate receptacles.

While in the present invention the teeth 30—31—32 and 26—27—28, are arranged on opposite faces of the members 29 and 25, so as to cause the cups 35 and 34 to rotate about their axes in different directions, it is of course to be understood that if desired the members 25 and 29 and the teeth thereon may be so arranged with respect to each other that the cups 34 and 35 will rotate in the same direction.

The member 17 may, if desired be provided with a chamber 76, adapted to receive a lubricant and which chamber may be provided with outlets 77 delivering into th bearings 46. A similar chamber 78 may b arranged in the member 18 and provide with outlets 79 for delivering lubrication t the spindle bearings. This chamber 78 may if desired, be provided with a suitable clo sure 80.

Obviously, other lubricating cups may b provided at points desired.

A knife or member 81 may be provided a a means over which the shell of the egg ma be broken, and this member 81 may be se cured in any convenient position but is pref erably supported by a bracket carried b the upright 19.

Drip cups or pans 82 may be provided preferably beneath the breaking member 8 and these pans, any number of which may t provided, four being here shown, are carrie upon a support 83, which latter is prefer ably rotatably mounted upon the uprigh 19, through the medium of the hub 84. Th hub 84 is preferably arranged beneath th bracket 24 and is rotatably supported b means of a collar 85 secured against rotatio by means of a fastening device 86. Beneat the collar 85 is a fixed collar 87 secure against movement by means of a fastenir device or pin 88, this latter collar 87 serv as a support for the collar 85.

In order to permit the support 83 carr ing the pans or receptacles 82, to be rotate when desired and to lock the same again accidental rotation, any suitable lockir means may be provided such as a yieldir pin 89 adapted to be seated in suitable r cesses 90 in the face of the hub 84. This p 89 is adapted to yield under stress appli to the support 83 to rotate the same b when one of the recesses 90 is in alineme with the pin 89 the latter will enter the r cess and the support 83 will be held again rotation.

If desired and as a means for assisting the separation of the albumen from the yo of the egg, when the contents are deposit in the cup 35, a suitable stripper may provided which is adapted to operate at ai desired point in the cycle of operation the apparatus.

To that end a substantially conical stri per 91 is provided, the diameter of the bo tom of the member 91 is slightly great than the external diameter of the top ed of the cup 35 so that as the stripper 91 lowered over the cup when the latter hol the contents of the egg, the stripper 91 w engage the albumen and will co-operate wi the edge of the cup to strip or sever the bumen from the yolk.

This member 91 is provided with a spin 92, projecting thereabove and which spin passes through a bearing 93 in a bracket connected with a staff or rod 95, the brac preferably resting upon a shoulder 96, a being held in position by a suitable thumb nut or collar 97, whereby the bracket may be removably secured to the spindle 95. Above the bearing 93, and secured to the spindle 92, so as to limit the downward movement of the spindle with respect to the bracket is an adjustable collar 98, and at the same time to permit a ready removal of the stripper member from the bracket when desired. An elastic member such as a coil spring 99 is interposed between the bottom of the bracket 94 and shoulder 100 formed on the member 91 so as to provide a yielding movement between the member 91 and the bearing 93, when the bracket 94 is depressed.

This stripper member 91 is adapted to be automatically and intermittently operated and to that end the staff 95 passes through a suitable guide 101 and is adapted to be given an intermittent reciprocating movement in a manner to be hereinafter described.

The stripper member 91 preferably receives its motion from the same source of power that drives the shaft 15 and to that end there is provided a suitable motor 102 (see Figure 4), to the shaft of which is connected a gear 103, which meshes with a gear 104 to which latter is connected a worm 105 for rotation therewith. This worm 105 meshes with a worm gear 106 rotatable about an upright bearing 107. Connected with the worm gear 106 for rotation therewith is a member 108, having a double cam portion 109—110. This member 108 is provided with an upright portion 111 constituting one element of a Geneva movement and co-operating with this portion 111 is a roller 112, which also rotates about an upright bearing 113. Secured to the shaft 15 for rotation therewith is the other element 114 of a Geneva movement. This element 114 is provided with recesses 115 adapted to receive the roller 112 and peripheral recesses 116 intermediate the recesses 115, which are adapted to receive the portion 111 of one of the Geneva elements for locking the element 114 against rotation at predetermined times in the interval of operation of the machine.

Thus it will be seen that when the member 102 is operated an intermittent rotation will be imparted to the shaft 15.

A member 117 is mounted for horizontal reciprocating movement in a suitable bearing 118, one extremity of the member 117 is preferably bifurcated to form a yoke 119, which yoke preferably stands astride of the hub of the member 108 and in close proximity to and preferably beneath the cam portions 109—110 of the member 108. Carried by the member 117 is a roller 120 which is adapted to be engaged by the cam portions 109—110 to move the member 117 in one direction.

Pivotally supported as at 121, preferably upon the base 10, is a bell crank lever 122, the end 123 of one of the arms of the lever being disposed in the path of movement of one end of the member 117. The end 124 of the other arm of the bell crank lever 122 preferably projects into a bearing or housing 125, through a suitable opening 126 and engages in a bearing in a slidable member 127, slidable in the housing. The housing is preferably provided with a cap 128, through which cap the staff 95 passes and said staff has a bearing in the cap.

The cap 128 is preferably provided with a seat 129, within which seat one end of a spring 130 rests. The other end of the spring engages a collar 131 which is adjustably held in position by means of a nut 132 engaging threads 133 on the staff 95, and by means of the adjustment of which nut 132, the tension of the spring 130 may be varied.

The spring 130 is so arranged that its normal tendency is to exert its stress against the collar 131 in a direction to shift the staff 95, so as to raise the stripper 91, and this tendency of the spring 130 also tends to move the bell crank lever 122 about its pivot 121, so as to hold the end 123 of the bell crank lever in engagement with the end of the reciprocating member 117. The spring 130 will cause these parts to operate in this manner at the time when the high portions of the cams 109—110 are out of engagement with the roller 120 carried by the member 117 but, as the member 108 is rotated and as the cams 109—110 successively engage the roller 120 the member 117 will be shifted in a direction to swing the bell crank lever 122 about its pivot 121 to lower the end 124 of the bell crank lever and thereby depress the member 127 together with the staff 95 and the stripper 91, against the stress of the spring 130.

By the provision of the spring or elastic member 99 between the stripper 91 and the bearing 93, it will be manifest that the stripper 91 will be permitted to accommodate itself to the cup 35, to a limited degree, irrespective of the operation or reciprocation of the staff 95.

The operating gears for rotating the shaft 15 for actuating the staff 95 are preferably arranged in a chamber 134 in the base 10, and this chamber is adapted to receive and hold a suitable lubricant.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. A machine for separating the contents

1. A machine for separating the contents of eggs and embodying an open receptacle adapted to receive the contents of the egg, mechanical means for advancing the receptacle, and means operating in timed relation to the movement of the receptacle to dump the contents therefrom.

2. A machine for separating the contents of eggs and embodying an open receptacle adapted to receive the contents of the egg, mechanical means for advancing the receptacle, and means operating in timed relation to the movement of the receptacle to dump the contents therefrom, the said means embodying provisions for locking the receptacle from a dumping movement.

3. A machine for separating the contents of an egg and embodying an open receptacle adapted to receive the contents of the egg, mechanical means for advancing the receptacle and means operating in timed relation to the advancement of the receptacle to dump the receptacle to deliver the contents thereof therefrom, the first recited means also operating to advance the receptacle during the dumping operation.

4. A machine for separating the contents of an egg and embodying an open receptacle adapted to receive the contents of the egg, mechanical means operating automatically to dump the receptacle to deliver the contents thereof therefrom, and mechanical means operating to impart an intermittent advancing movement to the receptacle.

5. A machine for separating the contents of an egg and embodying an open receptacle for receiving the contents from the shell, said receptacle being of a size that the albumen will spill or run over the side of the receptacle, means for discharging the contents of the receptacle after the albumen has been separated therefrom, and mechanism operating to automatically render the last recited means active.

6. A machine for separating the contents of an egg and embodying an open receptacle for receiving the contents from the shell, said receptacle being of a size that the albumen will spill or run over the side thereof, a second receptacle for receiving the albumen as it is separated from the contents of the first recited receptacle, and means individual to the receptacles and operating independent of each other for discharging the contents from the respective receptacles.

7. A machine for separating the contents of an egg and embodying an open receptacle for receiving the contents from the shell, said receptacle being of a size that the albumen will spill or run over the side thereof, a second recepetacle for receiving the albumen as it is separated from the contents of the first recited receptacle, and automatically actuated mechanical means for discharging the contents from each of the receptacles, the said receptacles being superposed and maintained in fixed relation to each other.

8. A machine for separating the contents of an egg and embodying an open receptacle for receiving the contents from the shell, said receptacle being of a size that the albumen will spill or run over the side thereof, a second receptacle for receiving the albumen as it is separated from the contents of the first recited receptacle, and means for discharging the contents from each of the receptacles, the said means embodying mechanism for dumping and for returning the respective receptacles.

9. A machine for separating the contents of an egg and embodying an open receptacle for receiving the contents from the shell, said receptacle being of a size that the albumen will spill or run over the side thereof, a second receptacle for receiving the albumen as it is separated from the contents of the first recited receptacle, means for discharging the contents from each of the receptacles, and means for advancing the receptacles, the first recited means embodying mechanism for dumping and returning the receptacles and also embodying mechanism for maintaining the receptacles against dumping during a predetermined portion of the cycle of advancing movement of the receptacles.

10. A machine for separating the contents of an egg and embodying an open receptacle for receiving the contents from the shell, said receptacle being of a size that the albumen will spill or run over the side thereof, a second receptacle for receiving the albumen as it is separated from the contents of the first recited receptacle, means for discharging the contents from each of the receptacles, and means for advancing the receptacles, the first recited means embodying mechanism for dumping and returning the receptacles and also embodying mechanism for maintaining the receptacles against dumping during the interval of time in the operation of the machine in which the albumen is being separated from the yolk.

11. A machine for separating the contents of an egg and embodying an open receptacle for receiving the contents from the shell, the said receptacle being of a size that the albumen will flow over the side thereof, means co-operating with the receptacle for assisting in severing the albumen from the yoke, and means separate from the last recited means and operating in timed relation thereto for discharging the yolk from the receptacle.

12. A machine for separating the contents of an egg and embodying an open receptacle for receiving the contents from the shell, the said receptacle being of a size that the albumen will flow over the side thereof, means co-operating with the edge of the receptacle for assisting in serving the albumen from the yolk, and means separate from the last recited means and operating in timed relation thereto for discharging the yolk from the receptacle.

13. A machine for separating the contents of an egg and embodying an open receptacle for receiving the contents from the shell, the said receptacle being of a size that the albumen will flow over the side thereof, mechanically operated means co-operating with the receptacle for assisting in severing the albumen from the yolk, and means separate from and operating in timed relation to the last recited means for discharging the yolk from the receptacle.

14. A machine for separating the contents of an egg and embodying an open receptacle for receiving the contents from the shell, said receptacle being of a size that the albumen will flow over the side thereof, means co-operating with the edge of the receptacle for assisting in severing the albumen from the yolk, mechanism for actuating the said means, and yielding means interposed between the first recited means and the said actuating mechanism therefor.

15. A machine for separating the contents of an egg and embodying an open receptacle for receiving the contents from the shell, said receptacle being of a size that the albumen will flow over the side thereof, a stripper co-operating with the edge of the receptacle for assisting in severing the albumen from the yolk, and mechanism operating to automatically render the said stripper active.

16. A machine for separating the contents of an egg and embodying an open receptacle for receiving the contents from the shell, said receptacle being of a size that the albumen will flow over the side thereof, and a positively actuated stripper co-operating with the edge of the receptacle for assisting in severing the albumen from the yolk and mechanism operating to automatically render the said stripper active.

17. A machine for separating the contents of an egg and embodying an open receptacle for receiving the contents from the shell, said receptacle being of a size that the albumen will flow over the side thereof, a stripper co-operating with the edge of the receptacle for assisting in severing the albumen from the yolk, and actuating means for the stripper, the said means operating to move the stripper in directions toward and away from the receptacle.

18. A machine for separating the contents of an egg and embodying an open receptacle for receiving the contents from the shell, said receptacle being of a size that the albumen will flow over the side thereof, a substantially conical shaped stripper adapted to be placed over the open side of the receptacle to co-operate with the edge of the receptacle to assist in severing the albumen from the yolk, and mechanism operating automatically to actuate the said stripper.

19. A machine for separating the contents of an egg and embodying an open receptacle for receiving the contents from the shell, said receptacle being of a size that the albumen will flow over the side thereof, a substantially conical shaped stripper adapted to be placed over the open side of the receptacle to co-operate with the edge of the receptacle to assist in severing the albumen from the yolk, mechanism operating automatically to actuate the said stripper, and a second open receptacle for catching the albumen as it is delivered from the first recited receptacle.

20. A machine for separating the contents of an egg and embodying an open receptacle for receiving the contents from the shell, said receptacle being of a size that the albumen will flow over the side thereof, a substantially conical shaped stripper adapted to be placed over the open side of the receptacle to co-operate with the edge of the receptacle to assist in severing the albumen from the yolk, mechanism operating automatically to actuate the said stripper, a second receptacle for catching the albumen from the first receptacle, said receptacles being bodily movable to convey away the separated ingredients, means for thus moving the receptacles, and means operating automatically at predetermined points in the cycle of movement of the receptacle for dumping the contents therefrom.

21. A machine for separating the contents of eggs and embodying a plurality of superposed traveling supports, means for imparting such movement to the supports, a plurality of open receptacles movable with each of the supports and with respect thereto, the receptacles of the upper support being disposed in alinement with and co-operating with the respective receptacles of the lower support, the uppermost receptacles being of a size to automatically separate the albumen from the yolk when the contents of the shell are delivered thereinto whereby the albumen will drop into the receptacle therebeneath, and means whereby the receptacles will be shifted with relation to their respective supports to discharge the separated ingredients therefrom.

22. A machine for separating the contents of eggs and embodying a plurality of superposed traveling supports, means for imparting such movement to the supports, a plurality of open receptacles movable with each of the supports and with respect thereto, the receptacles of the upper support being disposed in alinement with and co-operating with the respective receptacles of the lower support, the uppermost receptacles being of a size to automatically separate the albumen from the yolk when the contents of the shell are delivered thereinto whereby the albumen will drop into the receptacle therebeneath, and means operating automatically at a predetermined time in the cycle of movement of the supports for dumping the receptacles with relation to the respective supports.

23. A machine for separating the contents of eggs and embodying a plurality of superposed traveling supports, means for imparting such movement to the supports, a plurality of open receptacles movable with each of the supports and with respect thereto, the receptacles of the upper support being disposed in alinement with and co-operating with the respective receptacles of the lower support, the uppermost receptacles being of a size to automatically separate the albumen from the yolk when the contents of the shell are delivered thereinto whereby the albumen will drop into the receptacle therebeneath, and means operating automatically at a predetermined time in the cycle of movement of the supports for dumping the receptacles with relation to the respective supports, the said means embodying provisions for locking the receptacles against a dumping operation during a predetermined portion of the cycle of movement of the said supports.

24. A machine of the character described embodying a movable support having a bearing opening through the lateral face thereof, a gear having an opening therethrough and provided with a recess encompassing the opening and itself opening through one face of the gear, a bearing member passing through the gear, a flange on the said member adapted to be seated in said recess, said member extending beyond the opposite face of the gear and adapted to be seated in the bearing in the support and operating to hold the gear for free rotation adjacent the said lateral face of the said support, a member secured to the recessed face of the gear and overlapping said flange, an open receptacle, a spindle projecting therefrom and adapted to be inserted into the said bearing member, means connecting the spindle with the gear for rotation together, and means for maintaining the parts against separation.

25. A machine of the character described embodying a movable support having a bearing opening through the lateral face thereof, a gear having an opening therethrough and provided with a recess encompassing the opening and itself opening through one face of the gear, a bearing member passing through the gear, a flange on the said member adapted to be seated in said recess, said member extending beyond the opposite face of the gear and adapted to be seated in the bearing in the support and operating to hold the gear for free rotation adjacent the said lateral face of the said support, a member secured to the recessed face of the gear an overlapping said flange, an open receptacl a spindle projecting therefrom and adapte to be inserted into the said bearing membe means connecting the spindle with the gea for rotation together, and means securin the spindle detachably in position.

26. A machine of the character describe embodying a movable support having a beai ing opening through the lateral face ther of, a gear having an opening therethroug and provided with a recess encompassin the opening and itself opening through or face of the gear, a bearing member passin through the gear, a flange on the said memb( adapted to be seated in said recess, sai member extending beyond the opposite fa( of the gear and adapted to be seated in th bearing in the support and operating hold the gear for free rotation adjacent tl said lateral face of the said support, a men ber secured to the recessed face of the gez and overlapping said flange, an open r ceptacle, a spindle projecting therefrom ar adapted to be inserted into the said bearir member, means connecting the spindle wi the gear for rotation together, and yieldir means for securing the spindle detachab in position.

27. A machine of the character describ( embodying a movable support having bearing opening through the lateral fa thereof, a gear having an opening ther through and provided with a recess enco passing the opening and itself openii through one face of the gear, a bearing mei ber passing through the gear, a flange the said member adapted to be seated in sa recess, said member extending beyond t opposite face of the gear and adapted to seated in the bearing in the support ar operating to hold the gear for free rotatic adjacent the said lateral face of the sa support, a member secured to the recesse face of the gear and overlapping said flan; an open receptacle, a spindle projectii therefrom and adapted to be inserted in the said bearing member, means connectii the spindle with the gear for rotation t gether, and means securing the spindle c tachably in position, the last recited mea also serving to lock the said bearing memb in the bearing opening in the said support.

28. A machine of the character describ embodying a movable support having bearing opening through the lateral fa thereof, a gear having an opening thei through and provided with a recess enco passing the opening and itself openi through one face of the gear, a beari member passing through the gear, a flan on the said member adapted to be seated said recess, said member extending beyo the opposite face of the gear and adapted to be seated in the bearing in the support and operating to hold the gear for free rotation adjacent the said lateral face of the said support, a member secured to the recessed face of the gear and overlapping said flange, an open receptacle, a spindle projecting therefrom and adapted to be inserted into the said bearing member, means connecting the spindle with the gear for rotation together, there being an opening in the bearing member, said spindle being provided with a peripheral groove adapted to register with the last said opening, and a fastening device passing through the said opening and into the groove for detachably securing the parts together.

29. A machine for separating the contents of eggs and embodying an open receptacle, said receptacle being adapted to receive the contents from the shell and being of a size that the albumen will flow over the side thereof, means for automatically dumping the receptacle, and a drip pan disposed below the receptacle said receptacle and drip pan being bodily movable one with relation to the other.

30. A machine for separating the contents of eggs and embodying an open receptacle, said receptacle being adapted to receive the contents from the shell and being of a size that the albumen will flow over the side thereof, means for automatically dumping the receptacle, a rotatable support, and one or more drip pans carried by the said support and disposed below the plane of operation of the said receptacle.

31. A machine for separating the contents of eggs and embodying an open receptacle adapted to receive the contents from the shell, said receptacle being of a size that the albumen will flow over the edge when the yolk and albumen are delivered thereinto, a stripper adapted to co-operate with the edge of the receptacle for assisting in severing the albumen from the yolk, and means for moving the stripper in directions towards and away from the receptacle, the said means embodying a bell crank lever, a double cam member for actuating the lever, and means for actuating the cam.

32. A machine for separating the contents of eggs and embodying an open receptacle adapted to receive the contents from the shell, said receptacle being of a size that the albumen will flow over the edge when the yolk and albumen are delivered thereinto, a stripper adapted to co-operate with the edge of the receptacle for assisting in severing the albumen from the yolk, and means for moving the stripper in directions towards and away from the receptacle, the said means embodying a bell crank lever, an elastic element tending normally to move the bell crank in one direction, a double cam member operable upon the lever for actuating the latter against the stress of the said elastic element, and means for operating the cam member.

33. A machine for separating the contents of eggs and embodying an open receptacle adapted to receive the contents from the shell, said receptacle being of a size that the albumen will flow over the edge when the yolk and albumen are delivered thereinto, a stripper adapted to co-operate with the edge of the receptacle for assisting in severing the albumen from the yolk, and means for moving the stripper in directions towards and away from the receptacle, the said means embodying a bell crank lever, a cam device for actuating the bell crank, means for actuating the cam, a movable support for the said receptacle, and means responsive to the operation of the said cam device for moving the said support.

34. A machine for separating the contents of eggs and embodying an open receptacle adapted to receive the contents from the shell, said receptacle being of a size that the albumen will flow over the edge when the yolk and albumen are delivered thereinto, a stripper adapted to co-operate with the edge of the receptacle for assisting in severing the albumen from the yolk, and means for moving the stripper in directions towards and away from the receptacle, the said means embodying a bell crank lever, a cam device for actuating the bell crank, means for actuating the cam, a movable support for the said receptacle, and means responsive to the operation of the said cam device for moving the said support, the last recited means embodying a Geneva movement.

35. A machine of the character described embodying mechanism operating to automatically separate the contents of an egg after the contents of the shell are simultaneously delivered from the shell and into the machine, mechanism for delivering the separated elements separately from the machine and means operating to automatically render the last said mechanism active.

In testimony whereof I have signed my name to this specification, on this 9th day of March, A. D. 1922.

GEORGE WEISS.